March 24, 1970  D. B. LINDSAY  3,502,287
AIRCRAFT ENGINE MOUNTING SYSTEM
Filed Oct. 1, 1968  3 Sheets-Sheet 1
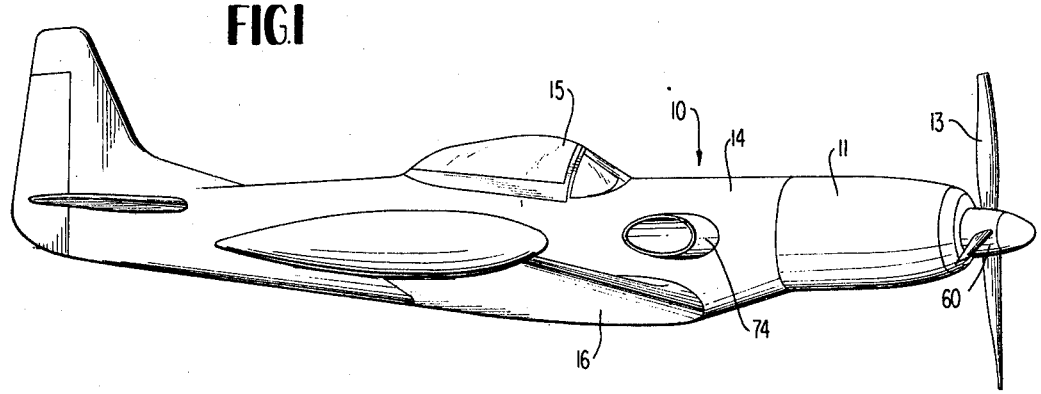
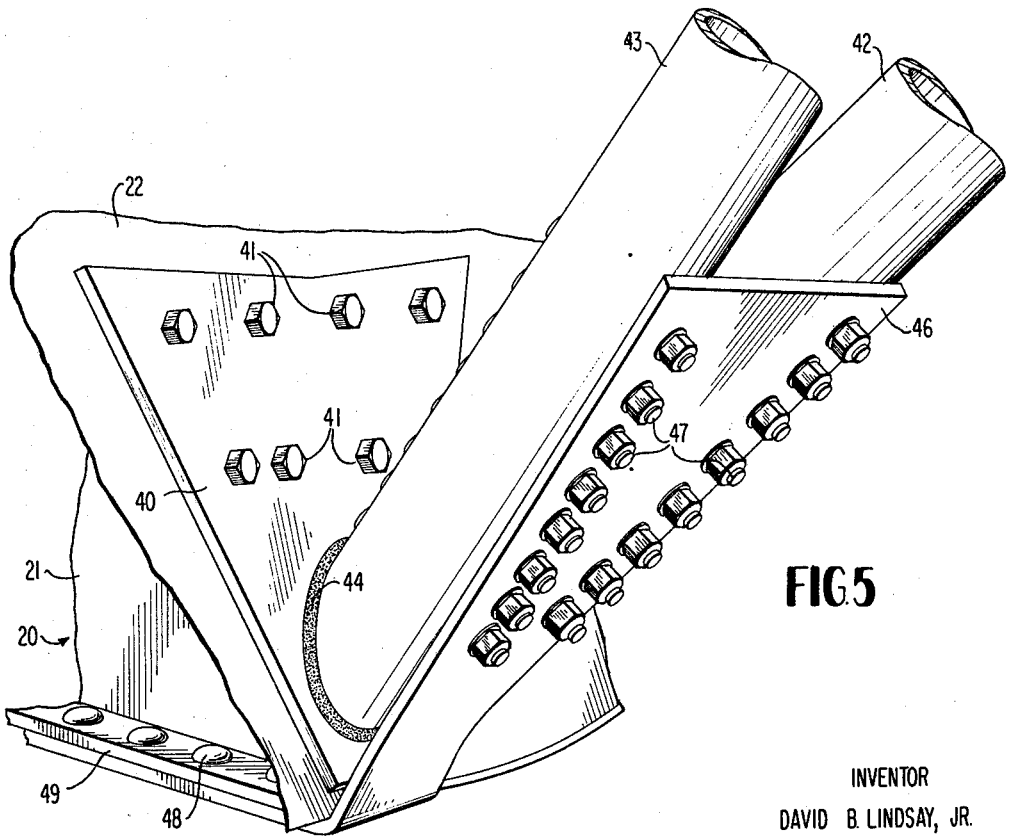
INVENTOR
DAVID B. LINDSAY, JR.
BY *Browne, Schuyler & Beveridge*
ATTORNEYS

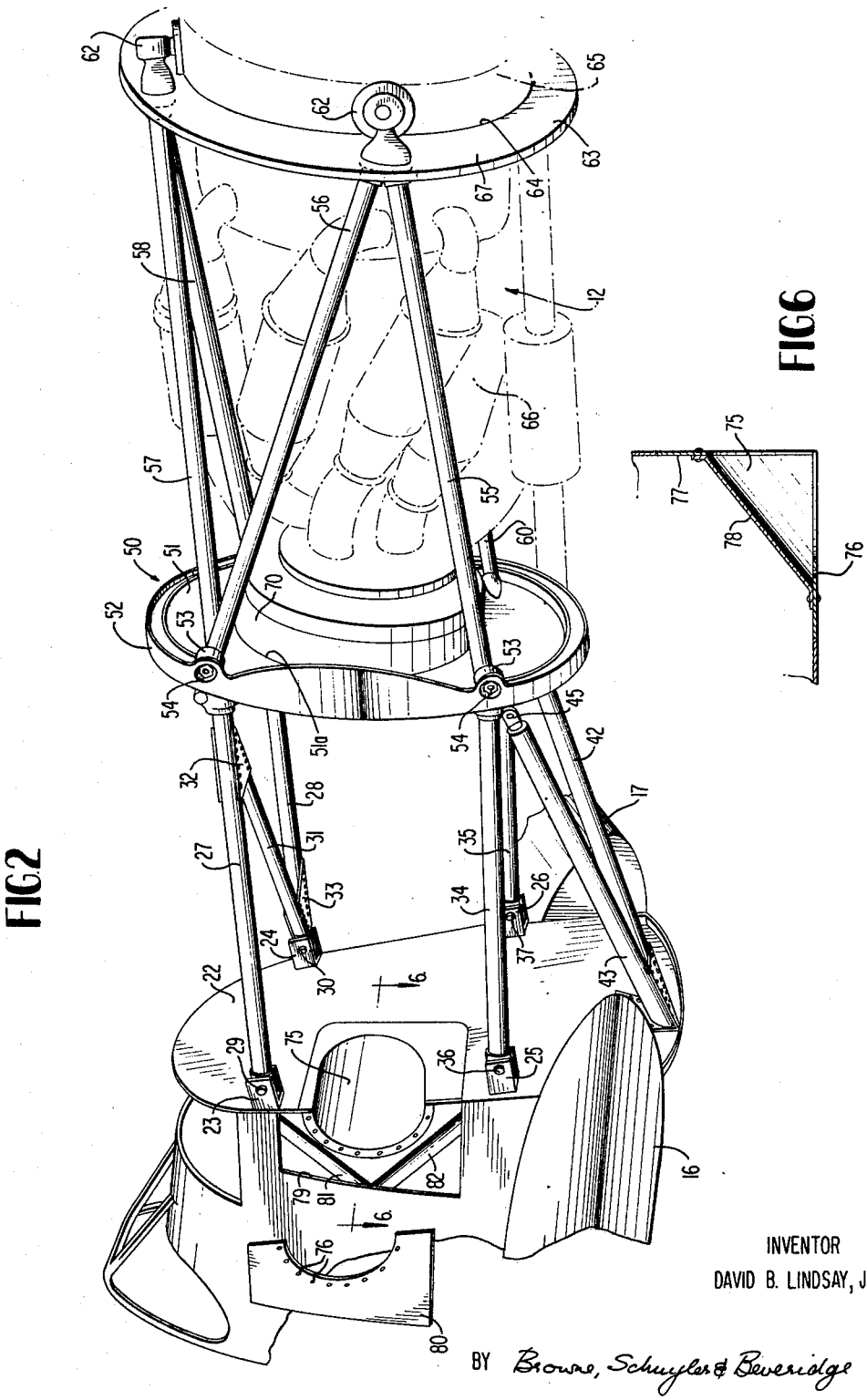

March 24, 1970   D. B. LINDSAY   3,502,287
AIRCRAFT ENGINE MOUNTING SYSTEM
Filed Oct. 1, 1968   3 Sheets-Sheet 3

United States Patent Office 3,502,287
Patented Mar. 24, 1970

3,502,287
AIRCRAFT ENGINE MOUNTING SYSTEM
David B. Lindsay, Box 1719, Sarasota, Fla. 33578
Filed Oct. 1, 1968, Ser. No. 764,061
Int. Cl. B64d 27/14, 27/08
U.S. Cl. 244—54                                    11 Claims

ABSTRACT OF THE DISCLOSURE

A mounting system for supporting a turbo-prop power plant in aircraft, both of new construction and of aircraft converted from piston engine power, in which a cantilevered support framework mounted on a structural wall of the aircraft supports the power plant forward of the structural wall a distance sufficient to permit the exhaust gasses from the turbine to be ducted overboard forward of the structural wall. The cantilevered support framework includes two sets of strut members, one detachably mounted on the structural wall of the aircraft and supporting a second wall in forwardly spaced relation thereto, and the second detachably mounted on the second wall and projecting forwardly therefrom. The second set of struts are detachably mounted to the engine in the vicinity of its center of gravity, with the engine extending rearwardly so that at least a portion of the engine's exhaust nozzle projects through the second wall. An exhaust duct extends laterally and rearwardly from the exhaust nozzle to conduct the exhaust gasses overboard between the second wall and the support wall.

---

This invention relates to the mounting of aircraft engines in airframes, and is particularly concerned with the problem of mounting turbo-prop engines in airframes.

While the present invention may obviously be employed in multiple engine aircraft, it is particularly useful for mounting turbo-prop engines in the nose section of single engine aircraft, and may advantageously be employed in the modification of existing single engine aircraft from piston engine to turbo-prop engine power. While the advantages of a gas turbine power plant over conventional piston engines in the operation of propeller driven aircraft have long been recognized, such gas turbine engines have not been widely employed in relatively high performance single engine aircraft due, at least in part, to the difficulty in mounting such engines on the airframe. This has been particularly true with the relatively long power plants in which the compressor, the combustion section, and the gas turbine are axially aligned, with the exhaust nozzle extending rearwardly from the turbine to discharge the exhaust gasses as a jet at the rear of the engine.

It is therefore the primary object of the present invention to provide an improved mounting for a turbo-prop engine in an airplane.

Another object of the invention is to provide an improved mounting structure for a turbo-prop engine in the nose section of a single engine airplane.

Another object is to provide an improved cantilevered mounting structure for a turbo-prop engine in an airplane.

Another object of the invention is to provide a cantilevered mounting structure capable of supporting a turbo-prop engine in the nose section of a single engine airplane and permitting the exhaust gasses to be ducted overboard forward of the airplane passenger compartment, or cockpit.

Another object is to provide such a mounting structure in which a rigid strut member is rigidly connected to the structural joint between the wings along the longitudinal vertical centerplane of the airplane to resist the moment produced by the cantilevered engine.

In the attainment of the foregoing and other objects, an important feature of the invention resides in providing a first cantilevered support structure attached to and supporting the engine in the vicinity of the engine's center of gravity, with the first support structure extending rearwardly along the engine and being detachably mounted on a support wall having a central opening surrounding the engine in the vicinity of the turbine section. A second cantilevered support structure is detachably mounted to the rear of this support wall and extends rearwardly therefrom along and to the rear of the exhaust cone and is detachably mounted to a structural fire wall of the airframe. An exhaust duct is attached to the engine exhaust cone and leads the exhaust through the second support structure and overboard forward of the aircraft structural wall. A rigid, chin brace support strut member is connected to the structural joint between the wings of the aircraft to provide a high-strength support for the lower portion of the support wall.

Other objects and advantages of the invention will become apparent from the following detailed description, taken with the drawings, in which:

FIG. 1 is a perspective view of a turbo-prop powered aircraft embodying the present invention;

FIG. 2 is a fragmentary perspective view illustrating the engine mounting structure mounted on the airframe, and illustrating in phantom a portion of a gas turbine engine supported in the mounting structure;

FIG. 5 is an enlarged perspective fragmentary view of a portion of the structure illustrated in FIG. 4; and FIG. 6 is an enlarged sectional view taken on line 6—6 of FIG. 3.

Figure 3:
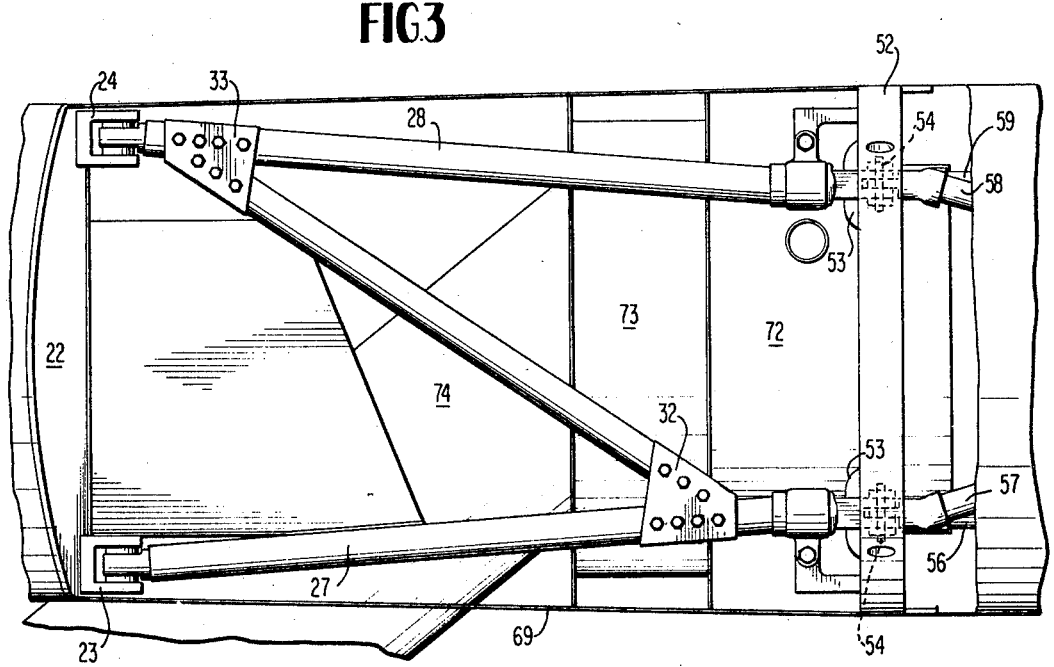
FIG. 3 is a top plan view of a portion of the mounting structure illustrated in FIG. 2.

Referring now to the drawings in detail, a fixed wing, single engine aircraft embodying the present invention is indicated generally by the reference numeral 10 and includes a nacelle 11 which houses a gas turbine engine 12 for driving the propeller 13. The nacelle 11 is detachably mounted on the nose section 14 of the airframe forward of the passenger compartment, or cockpit 15. The wings 16, 17, respectively, have main spars 18, 19 rigidly joined to a mating structural beam 20 having a central web 21 disposed in the longitudinal vertical centerplane of the aircraft. This mating connection of the wings 16, 17 provides the high strength, rigid structural framework necessary to support the aircraft fuselage and to provide structural integrity of the aircraft in operation.

The structural framework of the fuselage terminates at the forward portion of the passenger compartment 12 in a structural fire wall 22. The structural fire wall 22 is generally elliptical in shape, with its lower portion being positioned between and connected to the forward portion of wings 16, 17 and having its bottom portion rigidly connected to the structural beam 20 in a manner described more fully hereinbelow.

The overall mounting structure for the engine 12 is illustrated in FIG. 2, with portions of the engine being illustrated in phantom to more clearly illustrate the function and operation of the various components of the engine mounting structure. This mounting structure includes a pair of upper mounting brackets 23, 24 rigidly mounted on the forward face of structural wall 22, one adjacent each side edge and near the top thereof, and a second pair of brackets 25, 26 mounted in spaced relation below the first pair of brackets. A pair of upper, rigid struts 27, 28 are pivotally mounted, as by pins 29, 30 to the brackets 23, 24 and extend forwardly therefrom in a generally horizontal and slightly converging direction. A torque brace 31 has its forward end rigidly connected, as by bracket 32 to the forward end of strut 27, and its rear end rigidly connected, as by bracket 33 to the rear end of strut 28 to provide torsional rigidity to the structure to transmit engine or prop torque to the structural frame of the aircraft.

A second pair of elongated struts 34, 35, respectively, have their rear ends connected to the brackets 25, 26 as by pins 36, 37. The strut 34 extends generally parallel to and is spaced beneath the strut 27, while the strut 35 extends generally parallel to and is spaced beneath the strut 28, with the lower pair of struts being spaced substantially below the longitudinal axis of engine 12 and the upper pair of struts being spaced substantially above this longitudinal axis.

Figure 4:
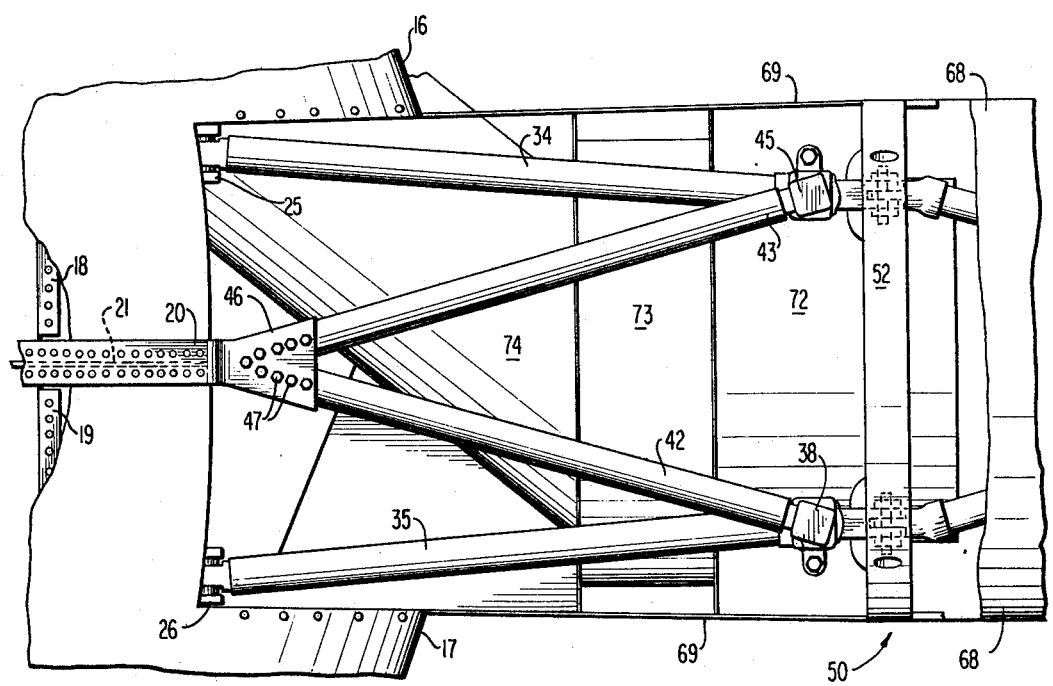
FIG. 4 is a bottom plan view of a portion of the airframe and mounting structure illustrated in FIG. 2.

A generally trapezoidal plate member 40 is rigidly connected to plate 22 adjacent the bottom edge thereof by a plurality of bolts 41. The bolts 41 extend through plate 22 and are rigidly connected to a suitable angle brace, not shown, rigidly joined to the vertical web 21 of structural beam 20. A pair of elongated, hollow tubular strut members 42, 43 are rigidly welded, as at 44, to the plate 40 with the struts 42, 43 diverging upwardly and forwardly from the vertical longitudinal centerplane of the aircraft. The forward end of strut 42 is pivotally connected, as by bracket 38, to the forward end of strut 35, and the forward end of strut 43 is pivotally connected to the forward end of strut 34 by bracket 45. As is most clearly seen in FIGS. 4 and 5, a rigid strap, or plate 46 is connected by a plurality of bolts 47 to the lower end of struts 42, 43, and extends beneath the lower end of plate 40 to be rigidly joined by a plurality of rivets 48 to the lower surface of the bottom flange 49 of the structural beam 20. The plate 46 extends rearwardly to a point beyond the main wing spars 18, 19 to further strengthen and reinforce the structural joint between the two wings 16, 17. Thus, the rigid struts 42, 43 are joined to the section of the airframe having the maximum strength and rigidity which is further reinforced by the plates 40, 46 which make up the mounting bracket for these rigid struts. This structure provides, in effect, a high strength, rigid chin strap, or chin brace, capable of supporting heavy vertical loads which may be applied to the mounting structure by the cantilevered support of the engine.

A generally elliptical support wall 50 is detachably mounted on the forward ends of struts 27, 28, 34 and 35, and is supported thereby in cantilevered relation forward of wall 22. Support wall 50 includes a central panel 51 having its outer periphery reinforced by a curved structural beam-like element 52. A large central opening 53 is formed in panel 51 in position to receive the aft portion of the engine 12. As shown in FIG. 2, and illustrated schematically by the phantom lines in FIGS. 3 and 4, the structural beam portion 52 of support wall 50 incorporates four mounting brackets 53 for detachably mounting the support wall on the forward end of the first cantilevered support structure including the strut elements described above. Each mounting bracket 53 includes a removable pin 54 which provides a pivotal connection between the associated strut and the support wall. However, the rigid struts 42, 43 positively prevent any vertical movement of the support wall 50 relative to structural wall 22, and the diverging relation of the struts 42, 43, in combination with the torque strut 31, provides torsional rigidity to the cantilevered support structure for the support wall 50.

The engine, per se, including the propeller 13 and the associated reduction gear mechanism contained in the prop hub 60, is supported in cantilevered relation forward of the support wall 50 by a second cantilevered support structure including a plurality of triangulated strut members 55, 56, 67, 68, 59, 60. These elongated struts have their rear ends connected to the pins 54 of mounting brackets 53 on the support wall 50, with struts 55 and 34 being pivotally connected by the same pin 54.

Struts 56 and 57 each are pivotally connected to the pin which connects strut 27 to the support wall, while struts 58 and 59 are connected to the pin which connects strut 28 to the support wall. Strut 60 is connected to the pin which connects strut 35 to the support wall.

Adjacent pairs of the triangulated support struts have their forward end connected to an engine mount 62. The respective engine mounts 62 are detachably mounted on the engine, one at the top thereof in the longitudinal vertical centerplane of the engine, and the remaining two in opposing relation on the sides of the engine. Only two of the engine mounts are illustrated in FIG. 2, it being understood that the third engine mount is connected to struts 59 and 60 and located in diametrically opposed relation to the engine mount which is connected to struts 55, 56. The engine mounts 62 are connected to the engine in the vicinity of a plane extending transverse to the longitudinal axis of the engine and containing the center of gravity of the combined engine and propeller.

An annular wall 63 is mounted on and is supported by the engine mounts 62, with the wall 63 having a central opening 64 surrounding the compressor section 65 of the engine 12 immediately aft of the points of connection of the engine to the engine mounts. Wall 63 provides a fire wall forward of the combustion section 66, and its outer peripheral rim 67, in combination with the outer periphery of the support wall 50, provides support for the cowling 58 of the nacelle 11. The structural skin, or cowling, 69 for the nose section 14 is supported on the outer periphery of the support wall 50 and the structural wall 22.

The triangulated struts of the second cantilevered support system are sufficiently long so that the entire combustion section 66 of the engine and at least a portion of the turbine section 70 of the engine is supported between the support wall 50 and the annular wall 63. The exhaust, or jet nozzle 72 projects through the central opening 53 in support wall 50, and discharges into an insulated deflector 73 which, in turn, discharges the exhaust gases into an exhaust duct 74 disposed at a substantial angle with respect to the longitudinal axis of the engine to lead the exhaust gasses overboard forward of the passenger compartment 15. The exhaust duct 74 extends through and projects outwardly from the cowling 69 to discharge the exhaust gasses as a jet on the right (when viewed from the rear) side of the aircraft in a direction to oppose torque applied by the propeller about the aircraft yaw axis.

The angle of the exhaust duct 74 with respect to the direction of the exhaust gasses leaving the jet nozzle 72 results in more heat being absorbed by the aft portion of the duct then by the forward portion. To minimize the effect of this unequal heat absorption by the exhaust duct, it is, of course, desirable to maintain the angle of the duct with respect to the engine axis as small as possible. To this end, the structural wall 22 is provided with a rearwardly extending trough-shaped depression 75 in the right side thereof to accommodate a portion of the exhaust duct. To cool the duct, and to minimize the amount of heat transferred from the duct to the airframe, the trough-shaped depression 75 is spaced rearwardly from the exhaust duct, and a plurality of apertures 76 are formed in the skin of the aircraft along an arcuate path adjacent the duct 74 and forward of the depression 75. Movement of the aircraft through the air and the projecting portion of the exhaust nozzle from the side of the aircraft combined with the effect of the jet stream from the exhaust duct, induces a flow of cooling air from within the nose section of the aircraft along the depression 75 and out through the apertures 76 between the exhaust stream and the side of the aircraft. This flow of cooling air has the effect of both cooling the aft side of the exhaust duct 74 and of reducing the amount of heat absorbed by the structural wall 22 and by the skin of the aircraft.

Preferably, the trough-shaped depression 75 is formed by removing a segment of the wall 22 and replacing the removed portion with a fabricated plate 77 having the trough-shaped element 78 attached thereto by riveting, welding, or the like. Also, preferably a portion of the skin of the airframe aft of the structural wall 22 is removed, as indicated at 79, and replaced with a heavier structural plate 80 having the apertures 76 formed therein. If desired, the structural wall 22 may be reinforced in the area by the addition of brace members 81, 82.

From the above, it should be apparent that the mounting structure of this invention makes it possible to support a turbo-prop engine in the nose sction of a single engine aircraft by cantilevering the engine forward of the passenger compartment a distance sufficient to permit the exhaust gasses to be ducted overboard forward of the passenger compartment. Thus, conventional, high performance gas turbine engines having a compressor, combustion section, turbine and exhaust nozzle axially aligned may be employed to power relatively high performance aircraft. At the same time, it is contemplated that the mounting structure may readily be adapted to mount a gas turbine engine in a wing nacelle of a multiple engine aircraft. Further, the mounting structure can readily be employed either in newly constructed aircraft or in the conversion of conventional piston engine powered aircraft to accommodate a turbo-prop power plant.

While I have disclosed and described a preferred embodiment of my invention, I wish it understood that I do not intend to be restricted solely thereto, but that I do intend to include all embodiments thereof which would be apparent to one skilled in the art, and which come within the spirit and scope of my invention.

I claim:

1. In a mounting system for a turbo-prop aircraft engine having axially aligned compression, combustion, turbine, and exhaust nozzle sections, said mounting system including a cantilevered support structure detachably connected to and supporting the engine in the vicinity of a plane extending substantially transverse to the engine's longitudinal axis and containing the engine's center of gravity, a support wall extending substantially parallel to said plane rearwardly of said combustion section and having a central opening formed therein, and mounting means on said support wall detachably mounting said cantilevered support structure on said support wall with at least a portion of said exhaust nozzle section of said engine extending through said central opening and rearwardly therefrom, the improvement comprising a second cantilevered support means detachably mounted on said support wall and extending rearwardly therefrom, a structural wall on said aircraft, and mounting bracket means on said structural wall detachably mounting said second cantilevered support means to provide cantilevered support for said engine, said support wall, and said cantilevered support structure forward of said support wall.

2. In the mounting system defined in claim 1, the further improvement wherein said second cantilevered support means comprises a pair of upper, substantially horizontally struts pivotally connected at their rear end to said structural wall one adjacent each side thereof at points substantially above the engine's center of gravity, and at their forward end to said support wall, a pair of lower, substantially horizontal struts pivotally connected at their rear end to said structure wall one adjacent each side thereof at points substantially below the engine's center of gravity, and at their forward end to said support wall, an upwardly and forwardly inclined chin brace connected at its forward end to said support wall, and bracket means rigidly connecting the rear end of said chin brace to said structural wall adjacent the bottom edge thereof and along the vertical center plane of the aircraft at a point spaced substantially below the engine's center of gravity.

3. In the mounting system defined in claim 2, the further improvement wherein said chin brace comprises a pair of elongated struts rigidly mounted on said bracket means and diverging from said longitudinal center plane, said elongated struts having their forward ends pivotally connected to said support wall, one adjacent the forward end of one of each of said lower pair of struts.

4. In a mounting system for a turbo-prop aircraft engine having axially aligned compression, combustion, turbine, and exhaust nozzle sections, said mounting system including a cantilevered support structure detachably connected to and supporting said engine in the vicinity of a plane extending transverse to the longitudinal axis of said engine and containing the engine's center of gravity, a support wall extending substantially parallel to said plane rearwardly of said combustion section and having a central opening formed therein, and mounting means on said support wall detachably mounting said cantilevered support means on said support wall with said engine extending through said central opening, the further improvement comprising a second cantilevered support means detachably mounted on said support wall and extending rearwardly therefrom, a structural wall on said aircraft, and mounting bracket means on said structural wall detachably mounting said second cantilevered support means to provide cantilevered support for said engine, said support wall, and said cantilevered support structure from said structural wall.

5. The mounting system defined in claim 4 further comprising an upwardly and forwardly inclined strut means rigidly mounted on said structural wall and pivotally connected to said support wall.

6. An aircraft comprising a pair of fixed wings rigidly joined at their inner ends to a structural web disposed in the longitudinal vertical center plane of the aircraft, a fuselage mounted on said wings and having a nose portion projecting forwardly thereof, a structural fire wall extending transversely of said fuselage adjacent the forward edge of said wings and separating said nose portion from a passenger compartment, said fire wall being rigidly joined to the forward end of said structural web, a cantilevered engine mounting structure mounted on and projecting forwardly of said structural wall, said cantilevered engine mounting structure including a pair of upper forwardly extending generally horizontal strut members pivotally mounted one adjacent each side of said fire wall and near the top portion thereof, a pair of lower forwardly extending generally horizontal strut members pivotally mounted one adjacent each side of said fire wall and spaced vertically below said upper struts, a substantially vertical transverse support wall detachably mounted on the forward end of said upper and said lower struts, a cantilevered triangulated strut support structure detachably mounted on and projecting forwardly of said support wall, and engine mounting means on the forward end of said triangulated strut support structure detachably mounting a turbo-prop engine, said engine mounting means being connected to said engine in the vicinity of the engine's center of gravity, said engine extending rearwardly from said engine mounting means and having its exhaust nozzle projecting through a central opening in said support wall.

7. The aircraft defined in claim 6 further comprising duct means connected to said exhaust nozzle leading the engine's exhaust gasses overboard forward of said structural wall.

8. The aircraft defined in claim 7 further comprising bracket means rigidly connected to said structural plate and projecting forwardly of said structural fire wall, and rigid strut means mounted on said bracket means and projecting upwardly and forwardly therefrom, said rigid strut means being connected to said support wall substantially below the center of gravity of said engine, and providing vertical support for said support wall and said engine.

9. The aircraft defined in claim 6 further comprising an exhaust duct operatively connected to said exhaust nozzle, said exhaust duct extending rearwardly and laterally from said nozzle to conduct the engine exhaust gasses through an aperture in the outer surface skin of said nose section and discharge the gasses overboard between said structural fire wall and said support wall on the side of the aircraft and in a direction to provide a jet thrust tending to equalize torque exerted by the engine propelor about the aircraft yaw axis.

10. The aircraft defined in claim 9 wherein said exhaust duct is disposed at an angle relative to the longitudinal axis of said engine which is no greater than about 45° at the point where said dust penetrates said outer surface skin.

11. The aircraft defined in claim 10 further comprising a plurality of orifices formed in said surface skin in the area rearward of and closely adjacent to said exhaust duct to induce a flow of air outward from said nose section to cool said surface skin rearwardly of said exhaust duct.

References Cited
UNITED STATES PATENTS

| | | | |
|---|---|---|---|
| 2,539,960 | 1/1951 | Marchant et al. | 244—54 |
| 3,020,004 | 2/1962 | Blyth et al. | 244—54 |
| 3,028,124 | 4/1962 | Sammons | 244—54 |

MILTON BUCHLER, Primary Examiner

JAMES E. PITTENGER, Assistant Examiner

U.S. Cl. X.R.

60—39.31; 248—5